Nov. 1, 1938.     B. MOORE, JR     2,134,883
ROAD ROLLER
Filed May 20, 1937     2 Sheets-Sheet 1
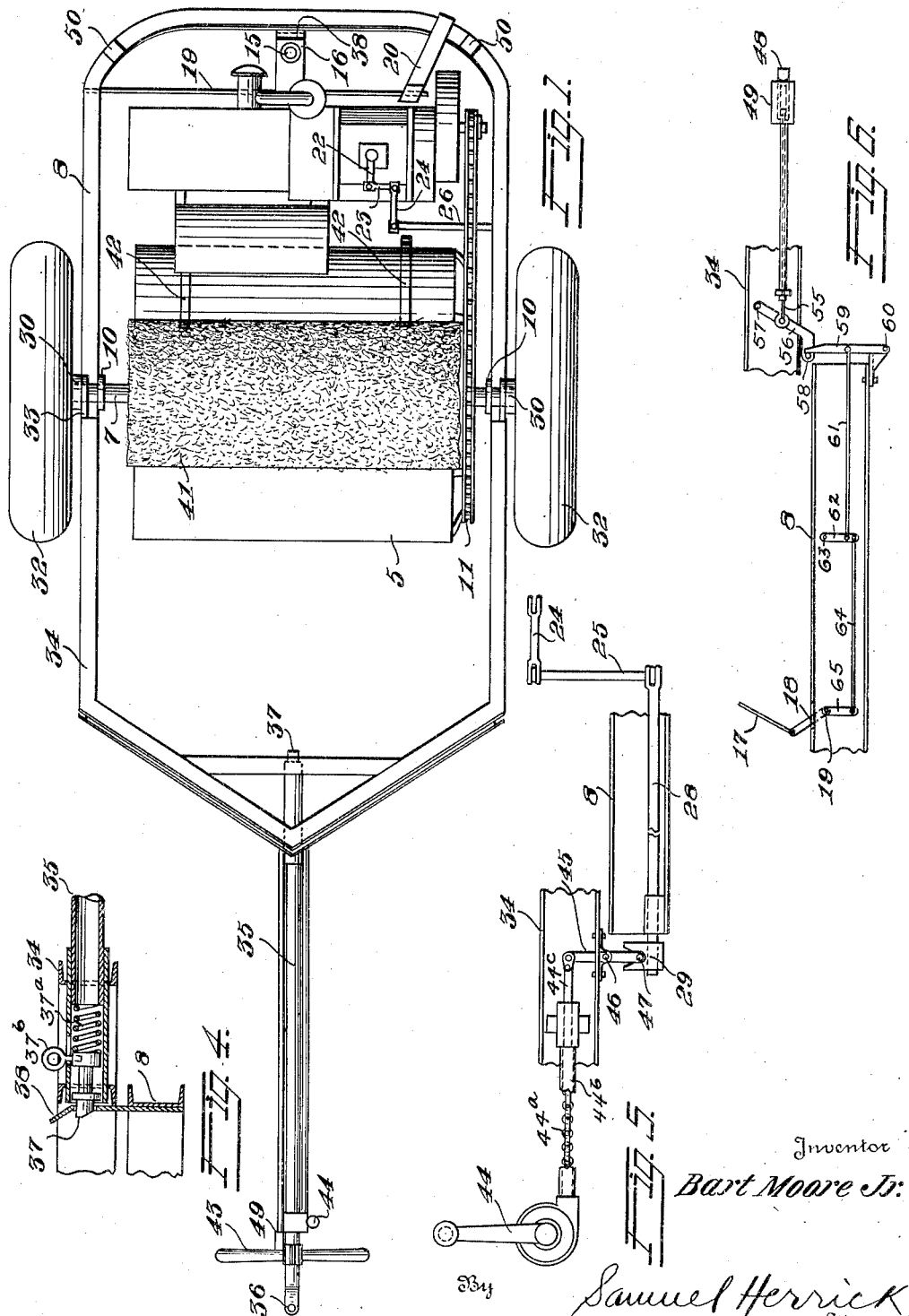
Inventor
Bart Moore Jr.
By
Samuel Herrick
Attorney Nov. 1, 1938.    B. MOORE, JR    2,134,883
ROAD ROLLER
Filed May 20, 1937    2 Sheets-Sheet 2
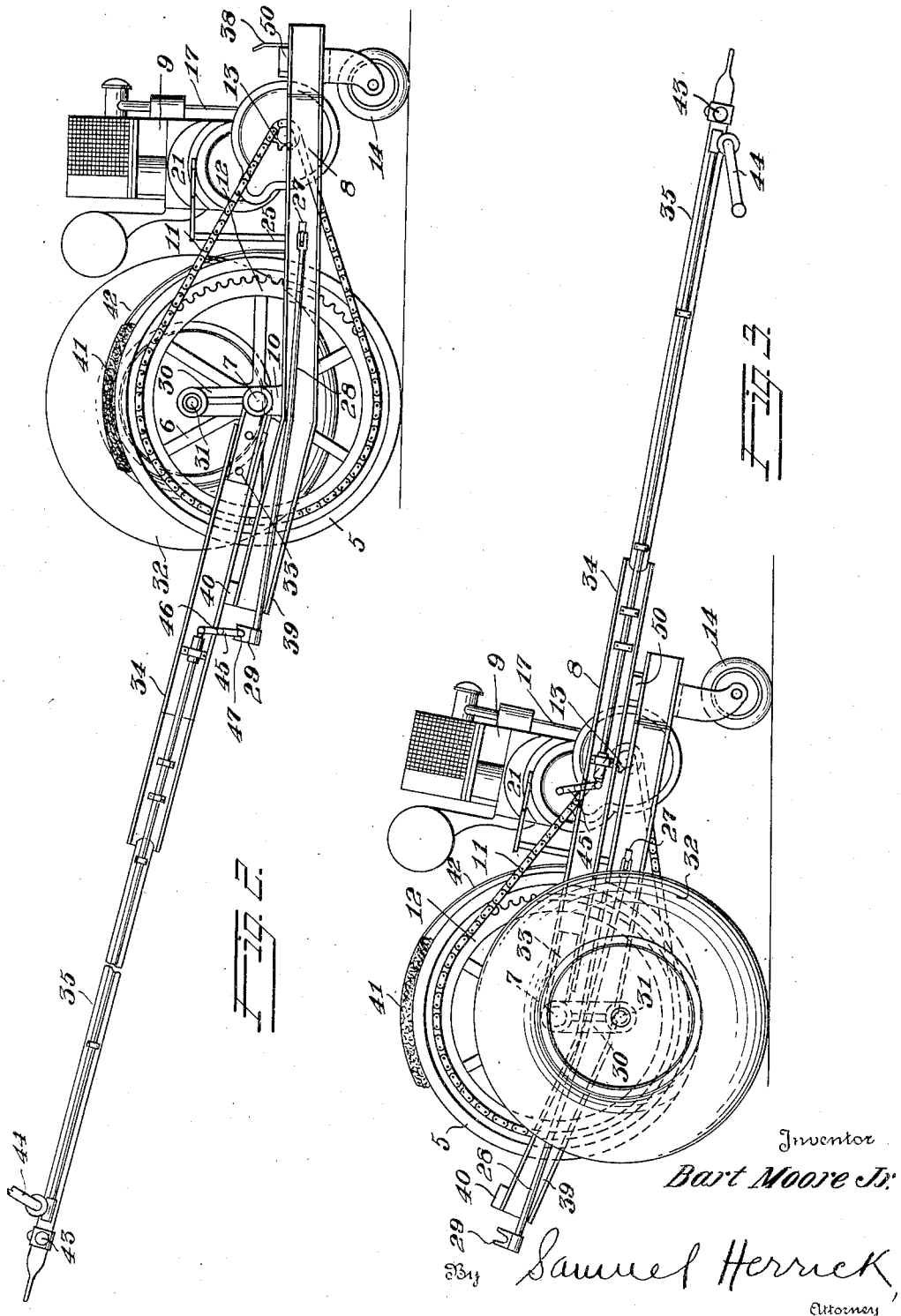
Inventor
Bart Moore Jr.
By Samuel Herrick
Attorney Patented Nov. 1, 1938

2,134,883

UNITED STATES PATENT OFFICE 2,134,883

ROAD ROLLER

Bart Moore, Jr., San Antonio, Tex.

Application May 20, 1937, Serial No. 143,813

10 Claims. (Cl. 94—50)

This invention relates to road rollers of the general character of that shown in my co-pending application Serial No. 78,283, filed May 6, 1936, of which this application is a continuation in part.

The U. S. patent to Biles, 1,886,367, of November 8, 1932, discloses a manually propelled road roller in which the road roller may be lowered into engagement with the roadway or elevated therefrom and supported upon rubber-tired ground wheels by the mere act of reversing the tongue or handle, i. e., by swinging said handle bodily from one side of the roller unit to the other.

In my application aforesaid, I have disclosed a reversible structure of the character above indicated, provided with an engine for propelling the roller and provided with the same type of eccentrically mounted ground wheels, arranged to lift the roller unit out of contact with the roadway when the draw bar or handle is swung over to one position, or to permit the lowering of the roller into engagement with the roadway when said handle is swung over to the other position.

The structure of the present application embodies the same general principles as those involved in my pending application aforesaid and adds thereto several features of novelty and advantage by virtue of which a more reliable construction is provided and a more facile handling of the roller is had. Among the features of novelty are the following:

First, the engine carrying frame is provided with a caster wheel and the parts are so balanced that while this caster wheel will relieve the operator of the necessity of supporting the weight of the engine during most of the time that the roller is being used, said caster wheel may be very easily lifted from contact with the roadway, if desired, when the structure is approaching freshly laid asphalt or obstructions of any kind.

Second, means are provided for enabling the operator to control both the clutch and throttle of the engine from the forward end of the handle so that the acts of guiding the structure as a whole and controlling the engine may be carried out with the maximum of ease and facility. Novel means are provided for maintaining the connections between the operating elements at the forward end of the handle and the clutch and throttle of the engine, despite the fact that this handle must at times be swung through an arc of approximately 180°, while the engine partakes of no such movement.

Third, improved means are provided for latching the ground wheel carrying frame to the engine and roller carrying frame, as hereinafter set forth. Further improvements and advantages of the invention will be set forth in the detailed description which follows.

In the accompanying drawings:

Figure 1 is a plan view illustrating the parts in the position that they occupy when the roller is in lowered or road-engaging position;

Fig. 2 is a side elevation of a roller constructed in accordance with the invention and with the roller in lowered position;

Fig. 3 is a side elevation of the structure with the roller in elevated position;

Fig. 4 is a detail sectional view of the latch between the two frames;

Fig. 5 is a detail view of a portion of the clutch actuating mechanism; and

Fig. 6 is a detail view of a portion of the throttle actuating mechanism.

Like numerals designate corresponding parts throughout the several figures of the drawings.

The roller 5, which may consist of one or more sections, is provided with suitable spiders or spokes 6 and is mounted to turn with respect to the main shaft 7. An engine and roller carrying frame 8, hereinafter referred to as the engine carrying frame, supports an internal combustion engine 9, of conventional form. The frame 8 is provided with ears 10, through which the main shaft 7 passes.

The roller may be driven from the engine 9 through the medium of a chain 11 and sprocket wheels 12 and 13. The forward end of the engine carrying frame is supported upon a caster wheel 14, the shank 15 of which is pivoted in bearings of a longitudinal frame member 16. The throttle actuating rod 17 of the engine is connected at its lower end to a crank 18 upon a transverse rock shaft 19.

This rock shaft is supported at its inner end from a bracket 20, and its outer end passes through the side of the engine carrying frame. Oscillatory movement is imparted to this rock shaft by the operator from the foward end of the handle or draw bar through means hereinafter described.

The engine comprises a conventional type of clutch, the casing of which is indicated at 21 and the operating lever of which is indicated at 22. Movement is imparted to this lever through link 23, crank arm 24, vertical rock shaft 25, a crank arm 26 upon the lower end of said shaft, the end of which projects through a slot 27 in the engine carrying frame, and clutch actuating rod 28 which extends along the side of the engine carrying frame. At its rear end, this rod 28 is provided with a fork 29 which serves a purpose hereinafter described.

The main shaft 7 carries crank arms 30 at its opposite ends, these arms being rigidly affixed to said shaft and said crank arms carrying the spindles 31 of stout, pneumatic-tired ground wheels 32. The crank arms 30 are rigidly secured through plates 33 to the side members of a ground wheel carrying frame 34. This frame converges at its outer end and carries a combined handle and draw bar 35. This element 35 is provided with an eye 36 at its forward end, by which it may be connected to the rear end of a work truck when the roller is to be transported from place to place.

A bolt 37, located at the inner end of the draw bar, is adapted to ride over and make latching connection with a spring plate 38, located at the forward end of the engine carrying frame. This occurs when the parts are in the position illustrated in Fig. 3, at which time the roller will have been bodily elevated from the roadway by the movement of the ground wheels into engagement with the roadway and because of the eccentric mounting of the ground wheels with respect to the roller.

When thus latched together, the elevation of the forward end of the draw bar to connect it to the rear end of a truck will lift the caster wheel free of the ground and permit the structure of Fig. 3 to be drawn behind the truck at a comparatively high rate of speed, with perfect safety, to the point of use of the roller.

When the time of use arrives, the draw bar is swung over to the position illustrated in Fig. 2, at which time the ground wheels are elevated and the roller is lowered into engagement with the road bed. Rearward extensions 39 of the engine carrying frame beyond the axle 7 underlie the ground wheel carrying frame, the latter engaging at this time with suitable cushioning blocks 40 upon the engine carrying frame.

It will be noted that these rearward extensions 39 are upwardly inclined, and thus the operator, who is to manually manipulate the roller during its operation under the influence of the engine may, by merely pressing downwardly upon the handle, elevate the caster wheel 14 from its engagement with the ground. This is desirable in making very short turns, and it is sometimes desirable when approaching newly laid asphalt.

By thus elevating the caster wheel, the roller may be caused to give the asphalt an initial rolling before the caster wheel is lowered into engagement with the road bed. Thus any possibility of the asphalt's sticking to the caster wheel is avoided. I preferably employ a mat-like swab 41, which is supported by spring arms 42 from the engine carrying frame.

The application of a suitable oil, such as kerosene or used crankcase oil, to this swab oils the surface of the roller in such manner as to prevent the adhesion of asphalt thereto. Suitable scrapers may be employed, as for example, a transverse member extending between the rearward extensions 39 of the engine carrying frame. However, scrapers in connection with road rollers are so common as to constitute no feature of invention.

The operator controls the roller wholly from the forward end of the draw bar, where transverse handles 43 are provided. A clutch actuating crank 44 is adapted to be grasped and given a partial turn by the right hand of the operator to throw the engine clutch into or out of engagement according to the direction of movement of said handle.

The handle 44 constitutes the actuating member of a conventional Renold push-pull control such as forms the subject matter of British Patent 339,108. It is common practice to use flexible members guided in rigid sheaths as push-pull control means for all sorts of mechanisms. The Renold control unit is one example of such a mechanism, and the well known conventional Bowden wire is another example.

In the Renold arrangement, the operation of handle 44 moves a chain-like flexible member 44ᵃ endwise through a rigid sheath 44ᵇ. At its end, the member 44ᵃ terminates in a rod 44ᶜ that is pivoted to the upper end of a lever 45. This lever is pivoted at 46 upon the frame 34, and its lower end is provided with a transverse pin 47 which engages with the fork 29, hereinbefore described, when the parts are in the position illustrated in Fig. 2.

In other words, the lever 45 and fork 29 form an automatically connectable and disconnectable engagement between handle 44 and the clutch operating lever 22. These parts are automatically connected when the parts are in the position illustrated in Fig. 2, at which time the roller is to be driven under the influence of the engine and manually steered, and they are automatically disconnected when the parts are in the position illustrated in Fig. 3. This permits the folding over of frame 34 upon frame 8.

It will, of course, be understood that the function of the clutch is to connect the engine to or disconnect it from drive chain 11 in the usual and well known way.

The bolt 37, see Fig. 4, is projected forwardly to engage plate 38 under the influence of a spring 37ᵃ. An eye 37ᵇ constitutes means for retracting the bolt against the tension of the spring when it is desired to release the latch and to swing frame 34 over to the position illustrated in Fig. 2.

The operator may operate handle 44 with the right hand while grasping handle 43 with the left hand and simultaneously therewith he may, with the forefinger of his left hand, grasp a hook-like end of a slide 48 that is guided in a keeper 49. This slide is connected by an ordinary Bowden wire 55 with a lever 56. This lever is pivoted at 57 to frame 34 and carries a pin 58 at its lower end.

When the parts are in road rolling position, i. e., in the position illustrated in Fig. 2, pin 58 lies in front of a lever 59 that is pivoted at 60 upon a bracket of frame 8. A link 61 connects an intermediate part of this lever 59 with an intermediate part of an idler lever 62.

Lever 62 is pivoted at 63 upon frame 8, and its lower end is connected by a link 64 with a crank arm 65 mounted upon the outer end of the transversely extending rock shaft 19. This element 48 constitutes the accelerator or throttle control of the invention, it being apparent that when the operator draws upon the hook-like member 48 with his forefinger, he moves the several parts to rock shaft 19 about its axis and consequently to move the throttle actuating rod 17 under the influence of crank 18.

It is well known that the movement of the conventional butterfly valve of an engine carburetor is against the tension of a spring (not shown). Thus, whenever the operator releases hook 48, the throttle will automatically close, while whenever the operator draws upon hook 48, the engine will be accelerated.

The arrangement shown in Fig. 6 constitutes an automatically connectable and disconnectable arrangement which permits frame 34 to be swung to its opposite limits of movement without interference by the throttle connections, while insuring that these connections will be automatically completed whenever frame 34 is swung to the position illustrated in Fig. 2.

I preferably provide cushioning blocks 50 upon the engine carrying frame, upon which the ground wheel carrying frame comes to rest at the time that the two frames are latched together as in Fig. 3.

It is believed that the operation of the device will be sufficiently apparent from the foregoing description. However, I may point out that by virtue of the structure herein shown and described, much of the burden upon the operator is relieved. The weight of the engine may be supported almost wholly upon the caster wheel and the roller, while at the same time, the pivotal mounting of the caster wheel permits the swinging of the structure back and forth at will and in all directions.

At the same time, a relatively light pressure upon the draw bar will elevate the caster wheel when that action becomes desirable, and because so little of the strength of the operator is required to effect the guiding of the structure, his hands are left correspondingly free to manipulate the clutch and throttle to best advantage.

Therefore, it is to be understood that the invention is not limited to the precise construction set forth, but that it includes within its purview whatever changes fairly come within either the terms or the spirit of the appended claims.

Having described my invention, what I claim is:

1. In combination, an engine carrying frame, an engine mounted therein, a roller mounted to turn in said frame, a caster wheel upon which the said frame is mounted at a point in advance of the engine, whereby said caster wheel may support the weight of the engine during the road rolling operation while permitting said frame to be swung freely horizontally, a ground wheel carrying frame mounted to swing with respect to the engine carrying frame, bearings for ground wheels carried by the ground wheel carrying frame and eccentrically disposed with respect to the axis of the roller, and ground wheels upon said bearings, the eccentric disposition of such bearings serving, when the ground wheel carrying frame is swung over upon the engine carrying frame, to bring the ground wheels into engagement with the ground and elevate the roller from the ground.

2. A structure as recited in claim 1, in combination with means for connecting the two frames to each other when the ground wheel carrying frame is swung over upon the engine carrying frame to bring the ground wheels into engagement with the ground and to elevate the roller under the eccentricity of the mountings of the ground wheel and roller.

3. A structure as recited in claim 1, in combination with an automatically acting latch by which the two frames may be latched to each other when the ground wheel carrying frame is swung over upon the engine carrying frame as described.

4. A structure as recited in claim 1, in combination with extensions carried by the engine carrying frame and underlying the ground wheel carrying frame when the latter is swung to that side of the roller axis remote from the engine.

5. A structure as recited in claim 1, in combination with extensions carried by the engine carrying frame and underlying the ground wheel carrying frame when the latter is swung to that side of the roller axis remote from the engine, the disposition of said extensions being such as to hold the ground wheel carrying frame at an inclination above the horizontal when the caster wheel is in engagement with the ground.

6. A structure as recited in claim 1 wherein the connections between the engine and the roller include a clutch and said engine includes a throttle, an elongated draw bar projecting from the ground wheel carrying frame, handles at the forward end of the draw bar, and means adjacent the handle for controlling both the throttle and the clutch from a point adjacent said handles.

7. In combination, an engine carrying frame, a roller mounted to turn in said frame, an engine carried by said frame, driving connections between the engine and the roller including a clutch, a ground wheel carrying frame adapted to be swung over upon and latched to the engine carrying frame, ground wheels journaled thereon in a position eccentric with respect to said roller, and a clutch actuating mechanism carried partly by the ground wheel carrying frame and partly by the engine carrying frame, the eccentric disposition of the ground wheels serving, when the ground wheel carrying frame is swung over upon the engine carrying frame, to bring the ground wheels into engagement with the ground and elevate the roller.

8. In combination an engine carrying frame, a roller mounted to turn in said frame, an engine carried by said frame, driving connections between the engine and the roller including a clutch, a ground wheel carrying frame, ground wheels journaled thereon in a position eccentric with respect to said roller, and a clutch actuating mechanism carried partly by the ground wheel carrying frame and partly by the engine carrying frame, said clutch actuating mechanism comprising members automatically disconnectable from each other when the ground wheel carrying frame is swung over upon the engine carrying frame and automatically connected when the ground wheel carrying frame is swung over in the opposite direction.

9. In combination, an engine carrying frame, a roller mounted to turn in said frame, an engine carried by said frame, driving connections between the engine and the roller including a clutch, a ground wheel carrying frame, ground wheels journaled thereon in a position eccentric with respect to said roller, a clutch actuating mechanism carried partly by the ground wheel carrying frame and partly by the engine carrying frame, said clutch actuating mechanism comprising an endwise movable rod and a fork carried thereby, said rod being mounted upon the engine carrying frame and a pivoted lever, and manually operable means for swinging the same, said lever and means being carried by the ground wheel carrying frame and said lever being shaped to engage said fork, as and for the purposes stated.

10. A structure of the character described, comprising a ground wheel carrying frame in substantially the shape of a horizontally disposed U with the closed side of the frame constituting its forward end, a roller disposed substantially at the center of the forward end of said frame, a shaft extending transversely across said frame, ears carried by the frame and engaging said shaft, a roller mounted to turn upon the shaft, an engine supported in the frame, means for driving from the engine to the roller, the rear portions of the side members of the frame being upwardly inclined, a ground wheel carrying frame in the form of a U-shaped yoke straddling the roller and engaging said shaft, cranks rigidly affixed to the ground wheel carrying frame and carrying ground wheel spindles, ground wheel upon said spindles, a draw bar extending from the outer end of the ground wheel carrying frame, handles at the forward end of the draw bar, and clutch and throttle controlling members for the engine adjacent said handles.

BART MOORE, Jr.